INVENTOR
ERNIE G. NASSIMBENE
BY [signature]
Attorney

Nov. 17, 1970 E. G. NASSIMBENE 3,541,272

REPRODUCTION SYSTEM WITH TAPE CONTROLLED CYCLIC REPRODUCTION OF ONLY A FIXED RECORD PORTION

Filed July 19, 1968 4 Sheets-Sheet 3

United States Patent Office 3,541,272
Patented Nov. 17, 1970

3,541,272
REPRODUCTION SYSTEM WITH TAPE CONTROLLED CYCLIC REPRODUCTION OF ONLY A FIXED RECORD PORTION

Ernie G. Nassimbene, San Jose, Calif., assignor to International Business Machines Corporation, Armonk, N.Y., a corporation of New York
Filed July 19, 1968, Ser. No. 746,179
Int. Cl. G11b 15/22, 15/52, 15/38
U.S. Cl. 179—100.2 8 Claims

ABSTRACT OF THE DISCLOSURE

A video recorder wherein the magnetic tape is helically wound about a drum with the drum containing a magnetic record and playback head for recording and playing back video information on angularly disposed tracks on the video tape. The magnetic head scans a first semicircular portion of the tape while this portion of the tape is being held fixed by two vacuum brakes positioned at both ends of the semicircular portion and a loop is formed before the drum. While the head is so scanning this first portion of the tape, pneumatic brakes at either end of the second semicircular portion of the tape are not actuated and this portion of the tape is moved longitudinally removing a slack portion between the first and second portions. As the head approaches the second portion of the tape, two vacuum brakes at either end of this portion are actuated so as to fix the second portion of the tape. While the magnetic head is scanning the second semicircular portion of the video tape, the two brakes at either end of the first semicircular portion are deactivated and this portion is moved longitudinally the distance between two tracks removing the loop ahead of the first portion. The cycle then repeats and the head scans the next track.

CROSS REFERENCE TO RELATED APPLICATIONS

U.S. patent application Ser. No. 653,782 filed July 17, 1967, and now abandoned, in the name of Ernie G. Nassimbene, entitled "Video Recording Technique."

BACKGROUND OF THE INVENTION

Field of the invention

Video recording and reproducing system utilizing magnetic tape helically wound about a rotating drum.

DESCRIPTION OF THE PRIOR ART

In the above identified application, there is disclosed a video recorder wherein the magnetic tape is helically wound about a drum with the drum containing a magnetic record and playback head for recording and playing back video information on angularly disposed tracks. The magnetic head scans a first semicircular portion of the tape while this portion of the tape is held fixed. The head then scans the second portion of the tape while it is held fixed. During this scan, the first semicircular portion is moved longitudinally the distance between two tracks and the cycle then repeats. During the operation, a closed loop servo keeps the head aligned wtih the tracks. This recorder enables "stop frame" playback with accurate alignment of head and track.

SUMMARY OF THE INVENTION

It is therefore an object of the invention to provide an improved apparatus for recording and playing back magnetic tape records having oblique tracks.

A further object of the invention is the provision of a new and improved recording and reproducing apparatus for recording and reproducing oblique video tracks on a helically disposed magnetic tape without requiring a servo to maintain the track and head in alignment.

A still further object of the invention is to provide a new and improved apparatus for transducing oblique video tracks on tape while the tape is fixed with an improved apparatus for advancing the tape transducers.

The above objects of the present invention are accomplished by an apparatus for transducing video signals which includes a video magnetic tape helically wound about a drum. The drum includes a rotating, recording and reproducing magnetic head. This head records and/or reproduces video tracks on the tape while that tape or that portion of the tape is fixed rather than moving. The tape or the portion of the tape is incremented longitudinally about the drum while the tape or that portion of the tape is out of magnetic contact with the magnetic head. The amount of tape to be incremented is measured by starting formation of a loop of the tape in response to the head reaching a predetermined position and stopping the formation of the loop in response to pulses on the tape. In so doing, the head is aligned with a track without requiring a servo and without any cumulative errors.

DESCRIPTION OF THE PREFERRED EMBODIMENT

Figure 1:
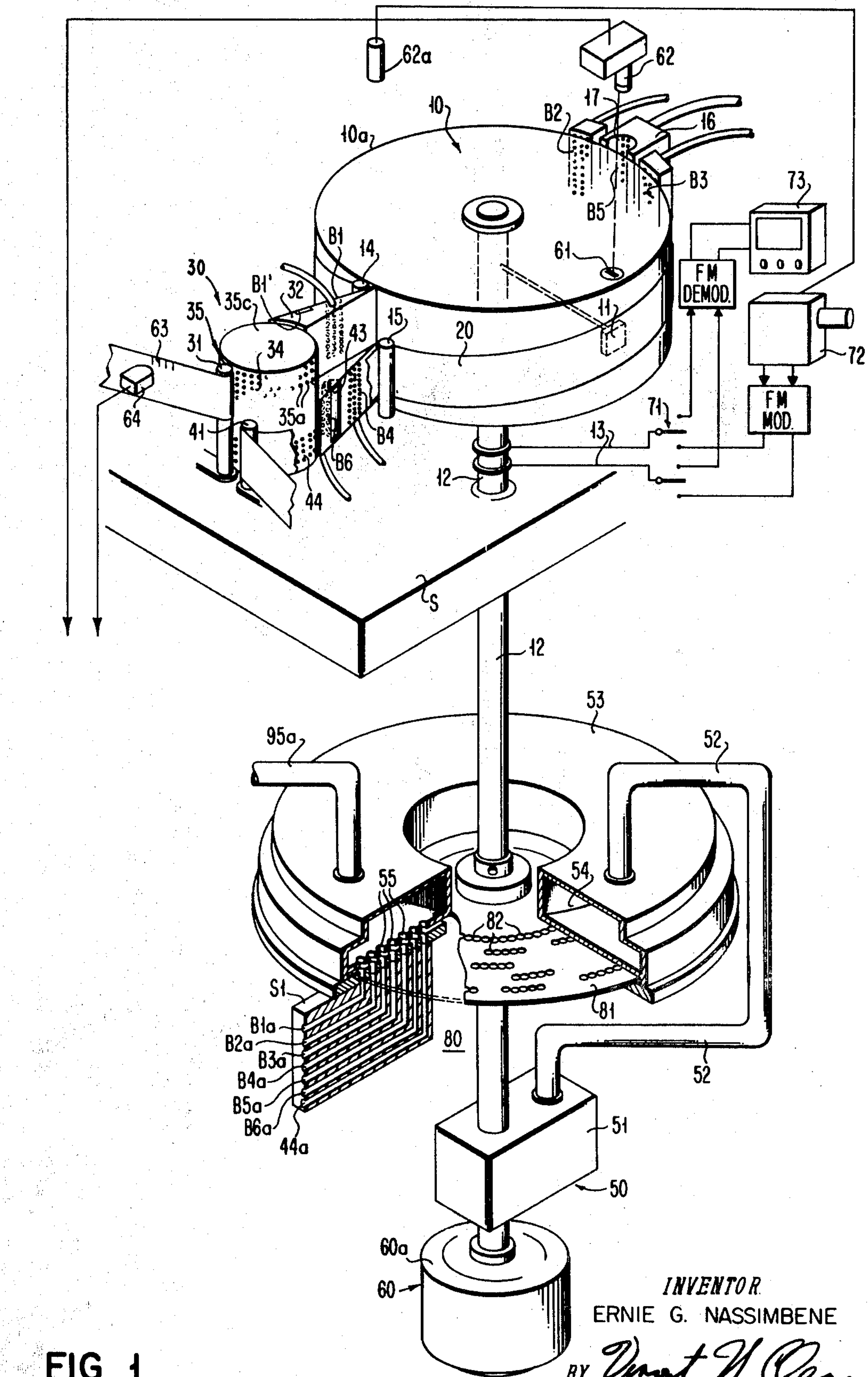
FIG. 1 is an isometric view partially in cross section of the video recorder embodying the invention.

In the embodiment of the invention shown in FIG. 1, a tape 20 is helically wound about a drum 10*a* of a drum assembly 10. The drum assembly 10 includes a magnetic recording and reproducing head 11 for recording angularly disposed tracks on the tape 20. The tape 20 is threaded off a supply reel R1 (as seen in FIGS. 3–6) past an upper input capstan assembly 30 past vacuum brakes B1′ and B1, then helically disposed about the drum 10*a* past a lower output capstan assembly 40 and onto a take-up reel R2.

During a first portion of the cycle of recording or reproducing, a first semicircular portion 22 of the tape 20 is held fixed by brakes B3 and B4. While portion 22 is held fixed, the head 11 scans portion 22. While the head 11 is so scanning the tape portion 22, a slack portion 23 is being formed by advancing a second semicircular portion 21. During the second half of the cycle, tape portion 21 is held fixed by brakes B1 and B2 while the head 11 scans portion 21. During this scanning, brakes B3 and B4 are deactivated, portion 22 is incremented forward so that slack portion 23 is pulled taut. The cycle then repeats itself. As can be seen by this operation the scanning of the tape by the head 11 occurs only while the tape being scanned is fixed. As stated in the above application, this enables "stop frame" scanning with accurate alignment of head and track.

The tape has pre-recorded sprocket pulse thereon spaced apart the desired space between video tracks (e.g., 0.3″) which are sensed by head 64. The amount of tape to be incremented to form loop 23 is measured by a loop L (FIGS. 3–6) formed between brakes B1 and B1′. The formation of the loop is started when head 11 reaches the 90° position as shown in FIG. 4. At this time brake B1 is actuated and brake B1' is deactivated. When head 64 senses the next sprocket pulse brake B1' is actuated and input vacuum cavity 34 is deactivated so that loops L (FIG. 3) is completely formed. When head 11 reaches the 360° position (FIG. 3) brake B1 is deactivated until head 11 reaches the 90° position shown in FIG. 4. As the head moves from 360° to 90°, the tape is moved about the drum, loop L disappears and the slack therein is moved to form slack loop 23. When head 11 reaches 90° brake B1 is activated and the cycle repeats.

By controlling the tape advance by these sprockets, complicated servos are not necessary. Further, no accumulative error results during advancing.

DETAILED DESCRIPTION

The drum assembly 10 (FIG. 1) includes the cylindrical drum 10*a* having fixedly mounted on the periphery thereof a magnetic recording and reproducing head 11. The head 11 is positioned midway between the upper and lower surface of and movable with the drum 10*a*. The magnetic transducer 11 is connected through leads 13 to a double pole, double throw switch 71 so that in one position, the head will be connected to a source of frequency modulation video signal such as from a conventional television camera 72 including a vidicon tube and a control unit for the vidicon tube. It will be understood that other sources could be utilized such as a television receiver. In the other position, the switch 71 in the reproduction mode connects the transducer 11 through an FM demodulator to the monitor 73 for reproducing video signals from the tape 20.

Figure 2:
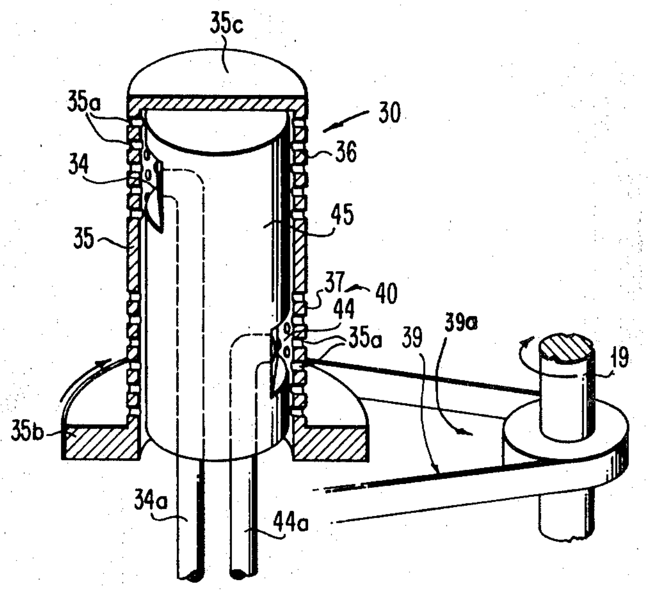
FIG. 2 is an isometric view partially in cross section of the vacuum capstan shown in FIG. 1.
Figure 8:
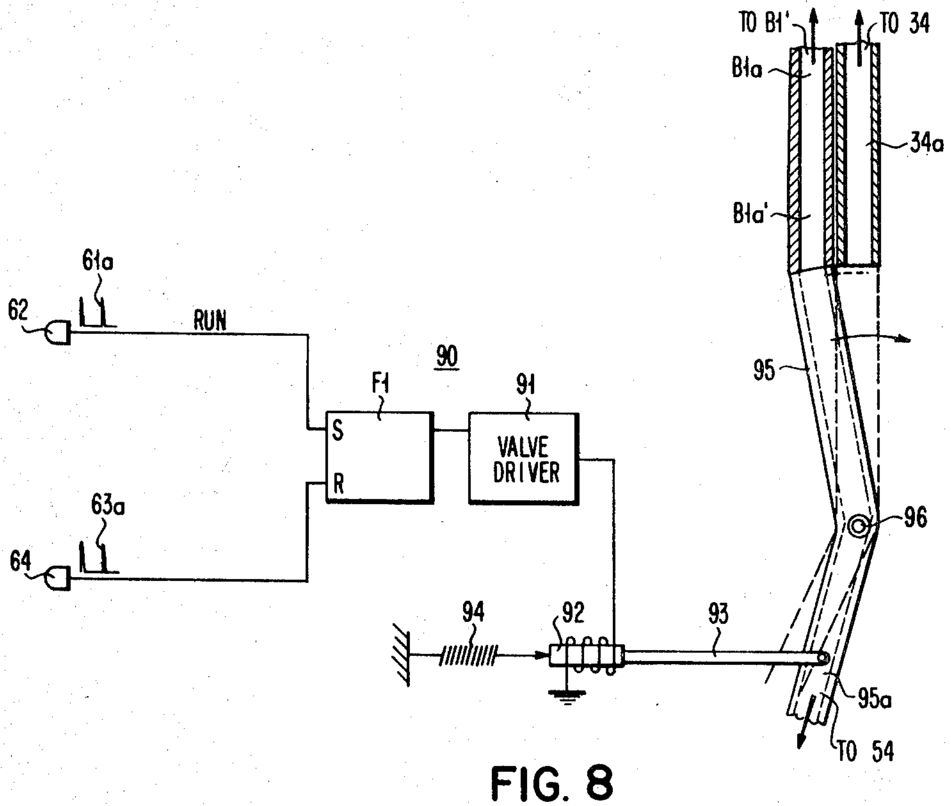
FIG. 8 illustrates a control circuit used with the embodiment illustrated in FIG. 1.

The tape is taken from the supply reel R1 (FIGS. 3–6) and threaded past a rotatable bearing 31 of the capstan assembly 30. The capstan assembly 30 includes as shown in FIGS. 1 and 2, a cylindrical section 36 of a cylinder 35 that rotates continually. The cylinder 35 includes an upper cylindrical section 36 and a lower cylindrical section 37. The drive illustrated includes belt 39 encircling a pulley 39*a* on a driven rotating shaft 19 that continually drives a flange 35*b* of member 35. Shaft 19 is continually driven by a motor unit not shown. At the other end of member 35 is an integral circular end wall 35*c* that rotatably rests on a fixed cylindrical member 45. Cylindrical member 45 has an input vacuum cavity 34 and an output vacuum cavity 44. Completely around sections 36 and 37 is a plurality of apertures 35*a* that continually communicate with cavities 34 and 44 during rotation of member 35. When it is desired to have the input capstan drive of the tape, a vacuum is applied to vacuum cavity 34 through passage 34*a* (FIG. 8). When it is desired to have an output capstan drive of the tape, a vacuum is applied to cavity 44 through passage 44*a*.

Figure 3:
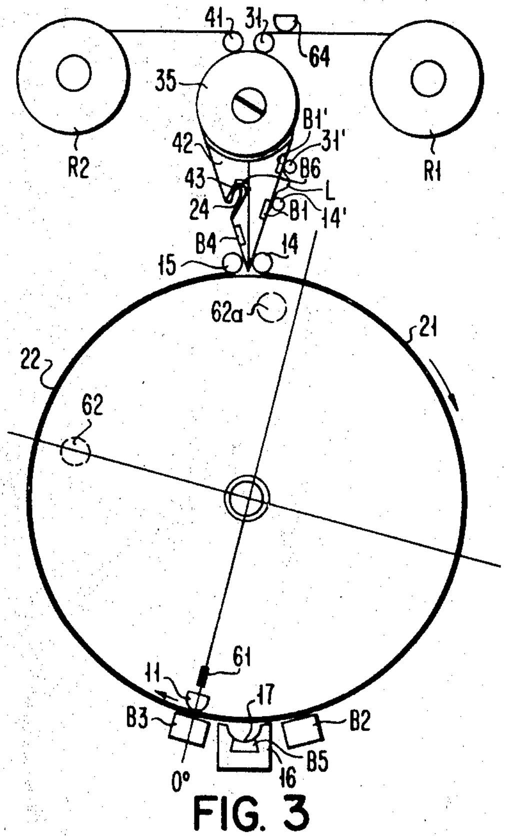
FIGS. 3–6 illustrate the relative position of the recording head and the magnetic recording tape during the operation of the embodiment of the invention illustrated in FIG. 1.
Figure 4:
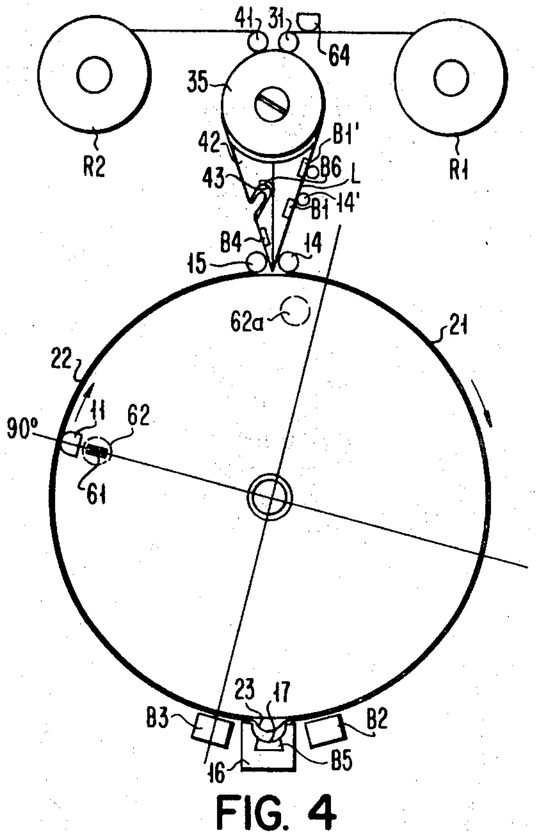

In addition, capstan assembly 30 includes an upper pie-shaped support member 32 having vacuum brakes B1' and B1 shown in FIGS. 1 and 3. As shown in FIGS. 1 and 3, the tape 20 is threaded past the surface of the pie-shaped member 32 between roller 31' and brake B1' and roller 14' and brake B1. Another rotatable bearing 14 is positioned adjacent to drum 10A and the pie-shaped member 32. The tape is threaded between bearing 14 and drum 10A. As can be seen the tape is always positioned near the brake B1' and B1. The tape is then helically wound about the drum 10A starting at the top near bearing 14, around the drum 10A, and in contact with a lower rotatable bearing 15 similar to bearing 14.

The output capstan assembly 40 includes in addition to the section 37 and a vacuum capstan cavity 44, a lower pie-shaped member 42 also having a vacuum brake B4 at the outside thereof and for operative contact with the tape 20. The tape is threaded between the rotatable bearing 15 and the side of the lower pie-shaped member 42. It is then threaded past as shown in FIG. 3 and FIG. 1, cylindrical member 35 (section 37) near the vacuum cavity 44 and past the rotatable bearing 41. Thus, it can be seen that rotatable bearings 31, 31', 14 and 14' tend to maintain the incoming tape in close contact with the upper portion 36 of cylindrical member 35 as well as the upper brakes B1 and B1'. Likewise, the rotatable bearings 15 and 41 keep the outgoing tape in close contact with lower brake B4 as well as the lower portion 37 of cylinder 35. The tape is then threaded past bearing 41, an audio recording and a reproducing head if desired (not shown) and then to the takeup reel R2.

The reel R2 is driven by a suitable motor (not shown) or other conventional means. Reel R1 is tensioned in suitable fashion so that tape 20 moves past the input capstan only when there is a vacuum in cavity 34.

The pie-shaped member 42 also includes a cavity 43 for tape slack. At the bottom of this cavity 43 is a vacuum brake B6.

Diametrically opposite to the capstan assembly 30 and 40 is an assembly 16 which forms therein a cavity 17. At the bottom of this cavity or at the end of this cavity is a vacuum brake B5. As shown in FIG. 3, this cavity 17 will accommodate a slack portion 23 of tape 20 and will be held therein by actuating the brake B5. When slack occurs at the output end of the tape, brake B6 will force a slack loop 24 into the cavity 43.

Equally spaced on either side of support assembly 16 are two additional vacuum brakes B2 and B3.

As stated above, the drum 10*a* is fixedly mounted on the shaft 12. Also fixed on the shaft 12 is a pneumatic or vacuum timing means 80 having a timing plate 81 which is fixedly secured to the shaft 12. A motor 60*a* of motor drive 60 is employed to rotate shaft 12 which also rotates plate 81 as well as the drum 10*a*. Additionally, in the embodiment illustrated, motor 60*a* and the shaft 12 drive a vacuum pump assembly 50.

The vacuum pump assembly 50 includes a vacuum pump 51 with a vacuum conduit 52 being connected to a circular housing 53 and chamber 54 which is fixed with respect to the support S. The housing 53 provides a vacuum chamber 54 having seven radially disposed holes 55. The vacuum achieved in vacuum pump 51 is thereby communicated to the vacuum chamber 54 and thence to the holes 55. A subsupport S1 includes seven vacuum passages mounted therein. This subsupport assembly S1 is fixedly mounted with respect to the main support S. Between the subsupport assembly S1 and the holes 55 of the circular housing 53 is timing plate 81 having apertures that can be aligned to provide communication between the apertures 55 and the seven vacuum passages.

As stated above, within the subsupport S1 is a plurality of vacuum passages which are connected to the brakes B1 through B6 and the output vacuum capstan 44. More specifically, passage B1*a* is connected, to brake B1 to supply, in proper sequence or timing, a vacuum to brake B1. Passage B2*a* is similarly connected to the brake B2 to actuate that brake in proper sequence. Likewise, and for the same reasons, passage B3*a* is connected to brake B3; vacuum passage B4*a* is connected to brake B4; vacuum passage B5*a* is connected to brake B5; vacuum passage B6*a* is connected to brake B6. Vacuum passage 44*a* is connected to the output capstan cavity 44. Thus, to effect the proper incrementing movement of the tape as described above, the timing plate 81 will have holes or slots 82 therein to provide vacuum from the chamber 54 to selected ones of the brakes B1–B6 and to the vacuum capstan 44 in proper sequence and timing. It will be understood that the timing will be identical for each when recording or reproducing. It will be understood that the vacuum passages, discussed above, are connected to vacuum chambers in the respective brakes. These chambers have holes therein to the atmosphere so as to enable the vacuum to be selectively applied to the tape 20.

FIG. 1 illustrates the timing plate 81 with the communicating holes 82 therein. The placement of these holes is in accordance with the timing chart in FIG. 7. Whether or not there is communication between one of the brakes or the output capstan and the vacuum chamber 54 through plate 81 is a function of the position of the head 11 illustrated in FIGS. 3–6 as in the 0°, 90°, 180° and 270°, respectively. If in any one position of this angular positioning of the head 11, the brake or the output capstan is indicated as being on, there will be a hole 82 in plate 81 communicating between the corresponding brake passage in the subassembly S1 and the vacuum chamber 54, when the head 11 is in that predetermined position. For example, the output capstan cavity 44 is always driving or on, therefore, in FIG. 1, there will always be a hole 82 that communicates between passages 44A and the vacuum chamber 54 by way of holes 55.

It will be understood that the cylinder 35 rotates clockwise as shown in FIG. 3 to advance the tape in the direction indicated around the drum **10*a***.

The motor driving means 60 includes the motor **60*a*. In addition as shown in FIGS. 3–6, a photo indicia such as a light source 61 is located on the top surface of the drum 10*a* in a radially disposed plane passing through the center of the magnetic head 11. A photocell 62 is mounted, as shown in FIGS. 1 and 3, in a fixed position directly above the light source 61 when this photo indicator and head 11 are at 90° as shown in FIG. 3. In this position, the center of head 11 is 90° displaced from the center of the brake B3. The tape 20 includes as shown in FIG. 1, magnetic track indicating means 63*a* which are spaced apart to indicate a desired track spacing on the tape 20. Coupled to and adjacent these tracks sync marks 63*a* on the upper portion of tape 20, is a magnetic head 64**.

It will be understood that when the indicia light source 61 passes the photodetector 62 (such as in FIG. 4), a pulse **61*a* shown in FIG. 8 will appear at the output of the photodetector 62. Likewise, when a magnetic mark 63 (FIG. 1) passes the head 64, a pulse 63*a* will appear at the output of the magnetic head 64**.

The photodetector 62 is connected to the S input of RS flip flop F1. The magnetic head 64 is connected to the R input of flip flop F1.

Figure 7:
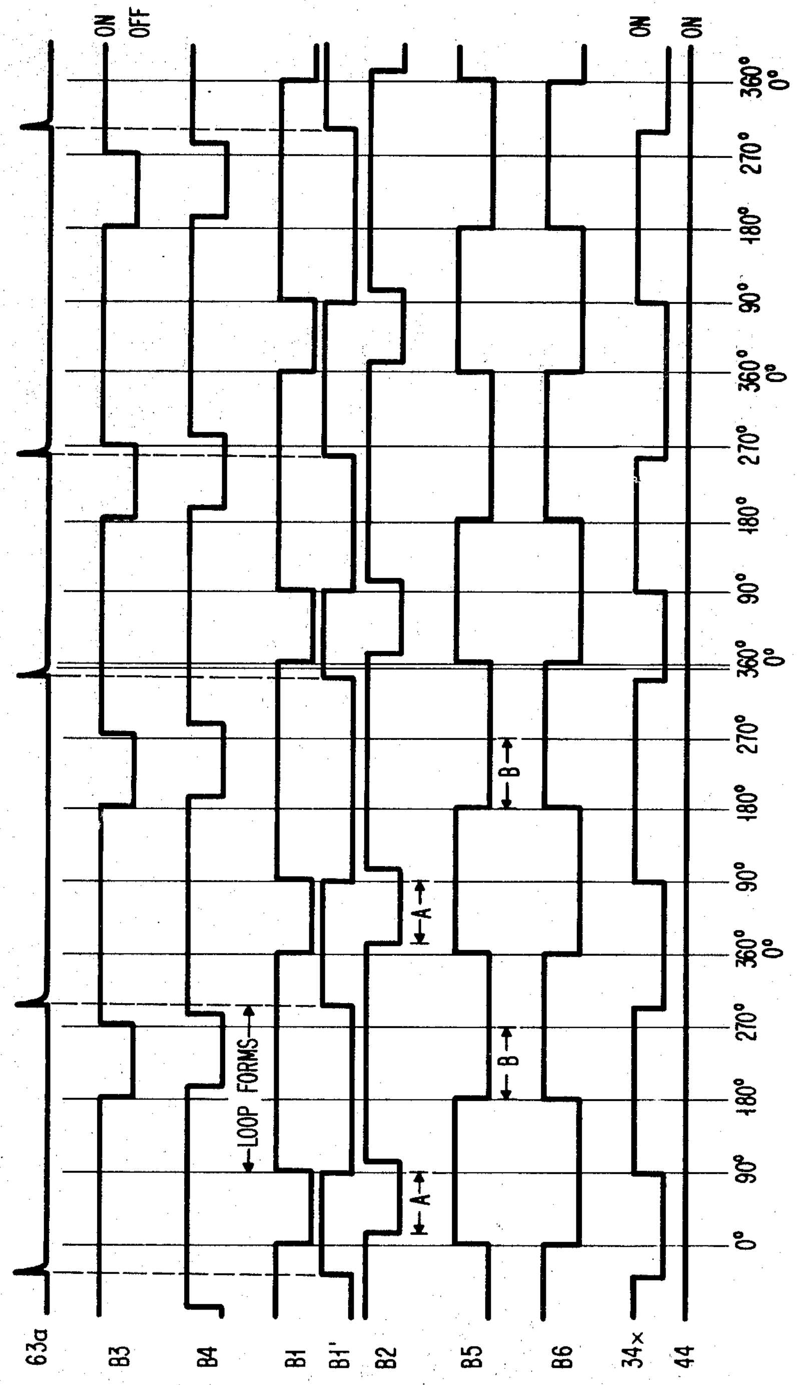
FIG. 7 illustrates a vacuum timing diagram useful in explaining the embodiment of the invention illustrated in FIG. 1.

The timing plate 81 does not control the vacuum to the input capstan cavity 34 but rather the input capstan cavity 34 and brake B1′ is controlled by a control system 90 shown in FIG. 8. Detector 62 supplies pulses **61*a* to the (set) input of RS flip flop F1. Head 64 is responsive to pulses 63 to supply pulses 63*a* to R (reset) input of F1. The pulses 61*a* will set flip flop F1 so that the tube 95 will be placed in the position as shown in dotted lines in FIG. 8. This results from a one output from F1 actuating solenoid 92 which forces arm 93 to the left against spring 94. Consequently, as illustrated in FIG. 7 at the occurrence of a pulse 61*a* from detector 62, to thereby set flip flip F1. Pulses 63*a* from head 64 will reset F1 so that the valve driver 91 will effect placing tube 95 in the position shown by solid lines. More specifically, the solenoid 92 will not be actuated and spring 94 will pull arm 93 to the right to thereby rotate arm 95 counterclockwise about pivot 96** into the position shown in solid lines in FIG. 8. In this position, brake B1′ will be actuated with a vacuum through passage B1*a* and capstan cavity 34 will not have a vacuum.

One end (**95*a*) of tubular arm 95 is connected directly to vacuum chamber 54. When arm 95 is in position, shown in dotted lines in FIG. 8, it will supply a vacuum to cavity 34 by way of passage 34*a***. Also in this position, no vacuum will be applied to passage B1*a*′ that communicates with brake B1′. Hence, brake B1′ will be deactivated and input capstan 36 will be activated with a vacuum.

In the position shown in solid lines a vacuum is applied through passage B1*a*′ to brake B1′. However, the vacuum to cavity 34 (via passage **34*a***) is discontinued so that the input capstan is discontinued.

A photodetector **62*a* is employed. This detector is positioned, as shown in dotted lines in FIG. 3, to provide an output pulse (from source 61) when head 11 begins magnetic coupling with an oblique video track. This produces a pulse that is applied to camera unit 72 to effect readout of one video frame (2 fields). The drum 10*a*** rotates at the conventional video frame rate of 30 revolutions per second. Consequently, each oblique video track contains one video frame (2 video fields).

OPERATION

The timing diagrams in FIG. 7 illustrate the effect of the timing plate 81 and chamber 54 to activate the vacuum brakes B1, B2, B3, B4, B5, B6, as well as cavity 44. It further illustrates the effect of pulses **61*a* and 63*a* on brake B1′ and capstan 34. If the level of the timing diagram is up or on, this is to indicate that during this period of rotation or position of the head 11, the corresponding brake or capstan has a vacuum being applied thereto. The timing shown for the output capstan cavity 44** indicates that it is always on.

FIGS. 3–6 as stated above illustrate four positions indicated by 0°, 90°, 180° and 270° of the head 11. As stated above, the 0° position is the position of the head 11 when it is radially disposed with the center of the brake B5 as shown in FIG. 3. It will be understood that the head 11 is located midway between the upper and lower surfaces of the drum **10*a***.

Initially, the tape can be threaded to place the tape in the position shown in FIG. 3 with the oxide near the drum and the head 11 near the 0° position. More specifically, the tape is threaded off reel R1, past head 64, past roller 31, capstan cylinder 35, brake B1′, rollers 31′, 14′ and 14 (with some slack tape placed between roller 31′ and roller 14′ to form loop slack L) around the drum past brake B2, B5, B3, roller 15, brake B4, roller 41 with some slack placed in the cavity 43. The head is placed before 0° and the motor **60*a* started so as to provide sufficient vacuum when the head reaches for 0°. By way of example, before head 11 reaches the zero degree position, a mark 63 is sensed by head 64** so as to actuate brake B1*a*′ and deactivate capstan cavity 34. At 0° brake B1 is deactivated and during movement of the head between 0° and 90°, the brake B2 is also deactivated with the cavity brake B5 being actuated. Thus, during movement of the head between 0° and 90°, brake B1′ is actuated and the semicircular portion of the tape 21 is being pulled from loop L into cavity 17 by the vacuum in brake B5 thereby removing loop L. This creates a slack loop 23 and removes loop L. Thus, portion 21 of the tape 20 is being incremented forward during this period. Thus, the slack between rollers 31′ and 14′ is the distance the tape is incremented (into cavity 17). During movement of the head between 0° and 90° as shown in FIG. 7, however, brakes B3 and B4 are on so that the other portion 22 of the tape 20 is held stationary while the head 11 scans helically from 0° position to 90° position. In addition, during this period, the cavity brake B6 is off and thus the capstan 44 is drawing tape (if any) out of the cavity 43, thus decreasing the size of the loop 24 in cavity 43.

Thus, when the head 11 reaches the position shown as 90° in FIG. 4, the cavity 17 is filled with tape and the cavity 43 is empty or substantially empty of tape. When the head reaches 90° position, the brake B1 is actuated and shortly thereafter the brake B2 is actuated to hold the tape portion 21 stationary with respect to the drum and the head. Further, when the head 11 reaches the 90° position, an indicia 61 is sensed by head 62 to produce a pulse **61*a* to thereby set F1 and rotate arm 95 to the dotted line position in FIG. 8 thereby deactivating the vacuum brake B1′ and activating input capstan 34**.

Figure 5:
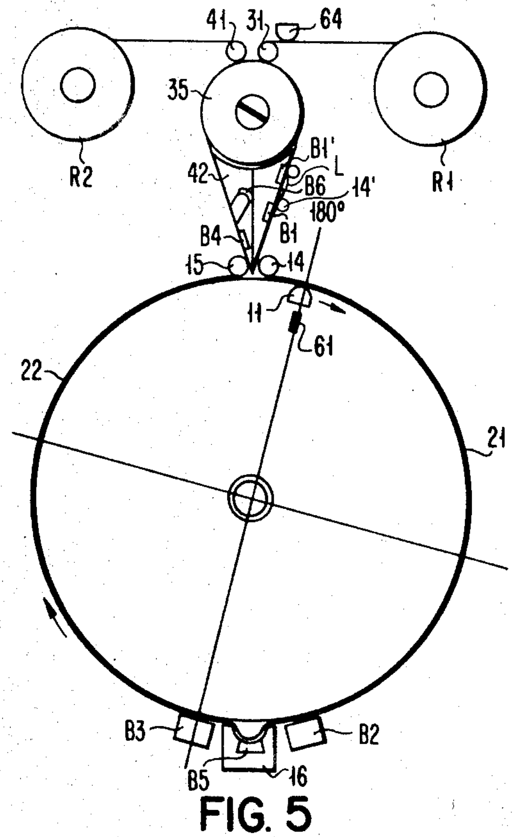
Figure 6:
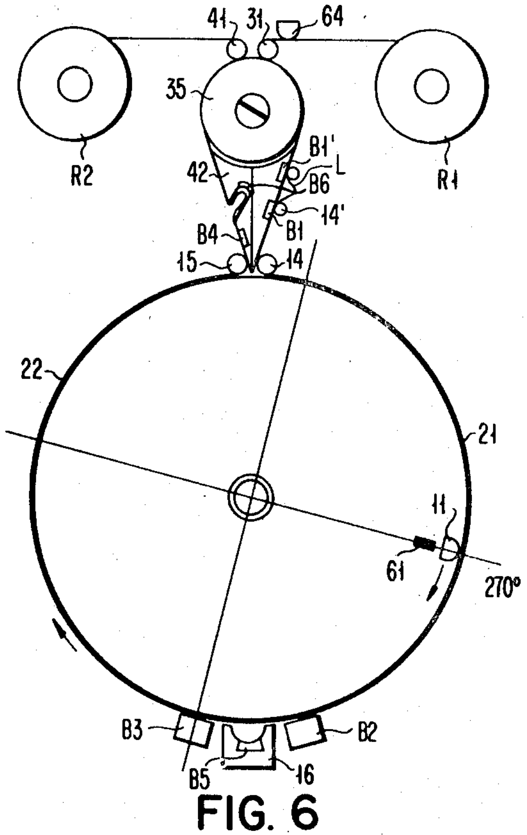

As the head moves from the 90° position shown in FIG. 4 to the 180° position shown in FIG. 5, both portions of the tape 21 and 22 are held stationary by the brakes B1, B2, B3, and B4 being actuated with a vacuum being applied to these brakes. Also, during this period, the cavity brake B5 is actuated so as to maintain the tape loop 23 securely in cavity 17. During this period since the brake B1 is actuated and B1′ deactivated, a loop L will start to form between the brakes B1 and B1′ as shown in FIG. 5. When the head 11 reach 180° position as shown in FIG. 5, the cavity 43 will have substantially no tape therein since B6 is deactivated from 0° to 180°. At this time (180°), the cavity brake B6 will be activated and brakes B1 and B2 will remain activated. Brake B5 in cavity 17 will be deactivated to enable incrementing or forwarding of the tape portion 22 during the next 90° rotation of the head 11. At the 180° position of the head 11 and shortly thereafter, brakes B3 and B4 respectively will be deactivated. Brake B4 will be deactivated so as to commence movement of tape from cavity 17 to cavity 43 (the brake B6 being activated during this period).

Thus, during the movement of the head from 180° to 270° brakes B1 and B2 are activated so as to keep the portion 21 fixed. In addition, loop L continues to enlarge. However, during a substantial portion of this period, both brakes B3 and B4 are deactivated so that movement is affected longitudinally of the portion 22 thereby emptying the tape from the cavity 17 and applying tape into the cavity 43. When the head reaches 270°, cavity 43 is substantially filled and the portion 21 is being held fixed by brakes B1 and B2. In addition, cavity 17 is emtpty. When the head reaches 270°, brake B3 is actuated and shortly thereafter brake B4 is actuated. Thus, commencing approximately at 270° head position, the portion 22 is fixed. Therefore, during the period in which the head 11 moves to 270° to360°, portion 21 is held fixed by brakes B1 and B2 and portion 22 is being held still by brakes B3 and B4. The speed of input capstan is shown as related to the speed of head 11 and the spacing of magnetic sprocket marks 63 so that the pulses 63*a* produced therefrom by head 64 occur somewhere between the 270° and 360° position of head 11. It will be understood that they could occur elsewhere in the cycle. When this occurs, flip flop F1 will be reset, tube 95 will be rotated from its dotted line to solid line position to thereby activate brake B1′ and deactivate the input capstan by removing the vacuum from chamber 34. At this point in time loop L stops enlarging. As head 11 reaches the 0° position, the cycle repeats itself as shown in the timing diagram in FIG. 7. During all subsequent cycles, the loop L is determined only by magnetic marks 63.

Thus, it is seen that the tape is moved from loop L to cavity 17 during roughly 90° of rotation of the head while the head is scanning a portion 22 of the tape that is fixed. Subsequently, while the head is scanning the other portion of the tape, during a similar 90° period, the tape is moved from one cavity 17 to another cavity 43. Thus, while one cavity is being loaded or filled, the other cavity, 17 or 43, during this same period is being emptied. During period A shown in FIG. 7, while the head 11 is rotating from 0° to 90°, cavity 17 is being filled from loop L by tape portion 21 being moved into that cavity and during this same period, cavity 43 is being unloaded or spilled while the portion 22 is being held fixed. During the period marked B in the timing diagram in FIG. 7, cavity 43 is being filled, by the spilling or unloading of the tape from cavity 17 as the head 11 moves from 180° to substantially 270° during which time the portion 21 is being held fixed by brakes B1 and B2.

Each incrementing of the tape, for example, slack from loop L to cavity 17 and from cavity 17 to cavity 43 increments the tape a distance the length of loop L which is the distance between magnetic marks 63. Preferably, this distance is .3 inch, or more, to define the distance between tracks. It can be seen, however, that a large range of such distance could be suitable. Thus, it is seen that the track spacing is determined by the slack in loop L created by magnetic marks 63. It will be understood that since the tape is helically disposed about drum 10*a* that the tracks will be angularly disposed with respect to the tape 20. Thus, as the head is positioned at approximately the 180° position, it will start the lower portion on the track which will end as the head reaches the position adjacent roller 15. Another track will start when the head 11 again reaches approximately the 180° position. Each oblique video track preferably contains one complete video frame or two video fields to be interlaced.

Since this same movement will generally apply during record or playback as described above and the cycles will occur in the same sequence. The one difference is that the video signal will be applied to the head 11 by way of, for example, a television camera 72 in a record mode (through an FM modulator) whereas in a playback mode, the head 11 will pick up the signal on tape 20 so as to provide video information for a TV monitor 73 (through an FM demodulator).

Thus, it is seen that by utilizing magnetic mark 63 to actuate brake B1′ and form Loop L, the same amount of tape will be advanced during playback as was advanced during record. This is true even though one spacing might be e.g., .3″ and the next spacing .6″. This is due to the fact that the tape movement is stopped by each magnetic sprocket mark 63. Further, as a consequence of this, the speed of advancing the tape is not critical since the next magnetic sprocket mark 63 will stop the tape in playback by the same system and same way it was stopped in record so that variations in advancing speed by 35 are not critical. This is illustrated in FIG. 7 by showing magnetic sprocket marks 63 which do not occur at the same angle in the cycle.

Thus, by the above embodiment, elaborate and costly servosystems are not necessary to align the head 11 with the recorded tracks. Further, in this system, there inherently cannot be any accumulative errors. The magnetic marks 63 could be recorded various ways. One method for example, would be to operatively connect a photo detector placed above the 270° position of head 64, during the recording process, to record a sync mark magnetically every time the head 11 passes 270°. In such a mode, with no magnetic sprocket marks already on the tape, the input capstan would run continually and brake B1′ would never be actuated. In playback, the drum 10*a* would be driven at the same speed as in recording and member 35 could be run somewhat faster.

The magnetic marks 63 could also be prerecorded before recording by connecting head 64 to a square wave or blocking oscillator and running the tape past head 64 at speed that records mark in the form of magnetic mark 63 at the desired spacing.

It will be understood that when tapes pass between light detectors 62 and 62*a*, the output of the detector 66 may actually go down. Thus, as a practical matter in such a case, some type of D.C. inverter or its equivalent could be connected to the output of these detectors to produce "one" output.

As stated above, each video track contains one complete composite video frame (two fields to be interlaced). This is done during recording by actuating readout of the vidicon tube (in unit 72) by a pulse from light detector 62*a*. This pulse occurs when head 11 begins scanning a video track. Camera 72 provides a composite video output (including horizontal and vertical sync with the video). The composite readout from camera 72 is at the conventional video rate of 30 frames/sec. with each frame containing two fields to be interleaved. The motor 60*a* preferably rotates the drum 10*a* at 30 revolutions/sec. Consequently, each track contains one complete video frame.

It will be understood that vertical tape edge guides (not shown) are normally employed to maintain the tape vertically in the threshold position shown in FIG. 1. These guides, for example, could be mounted above and below the tape near bearings 14, 15, 31 and 41 and near heads 64 and 67.

While the invention has been particularly shown and described with reference to a preferred embodiment thereof, it will be understood by those skilled in the art that various changes in form and details may be made therein without departing from the spirit and scope of the invention.

What is claimed is:

1. A magnetic recording and reproducing apparatus for recording and reproducing signals on a flexible recording medium having a plurality of spaced indicia thereon, comprising:

a transducer head movable with respect to said medium, first braking means holding said medium at a first station for a predetermined time period, advancing means moving said medium past a second station during said time period, second braking means holding said medium at said second station in response to said indicia so as to form a slack loop between said first and said second station, and another advancing means longitudinally advancing said medium to remove said loop to advance said tape a distance equal to the length of said loop.

2. Apparatus as set forth in claim 1 wherein said first braking means is actuated during a predetermined travel of said head with respect to said medium to hold said medium at said first station during said predetermined time period.

3. Apparatus for magnetically recording and reproducing video signals comprising:

a cylindrical surface, a magnetic tape positioned near a second and first station and then helically disposed about said cylindrical surface, said tape having a plurality of spaced indicia recorded thereon, rotating means, a first transducer rotatable by said rotating means in transducing relationship with said helically disposed portion of said tape in a predetermined plane which intersects said helically disposed portion of said tape at an angle thereto to define a video track, first braking means holding said tape at said first station for a first time period, first advancing means advancing said tape toward said first station during said time period, sensing means, second braking means actuated by said sensing means to hold said tape at said second station during a second time period in response to said indicia to form a slack loop between said first and said second station, second advancing means advancing said tape past said first station and around said surface during said second time period and after said first time period.

4. Apparatus as set forth in claim 3 wherein said first braking means is actuated during a predetermined travel of said head with respect to said tape to hold said tape at said first station during said first time period.

5. Apparatus as set forth in claim 3 wherein said sensing means deactuates said first advancing means in response to said indicia.

6. Apparatus for recording and reproducing video signals as set forth in claim 3 wherein said sensing means includes a second transducer spaced from said helically disposed portion of said tape in transducing relationship with said track which, in response to being in transducing relationship with said indicia to actuate said second braking means.

7. Apparatus for recording and reproducing video signals as set forth in claim 6 wherein said sensing means is responsive to said indicia being in transducing relationship with said second transducer to simultaneously actuate said second brake and deactivate said first advancing means.

8. Apparatus for recording and reproducing video signals as set forth in claim 7 wherein said rotating means rotates said first transducer in transducing relationship with said video track during said first time period.

References Cited

UNITED STATES PATENTS

| | | | |
|---|---|---|---|
| 2,648,589 | 8/1953 | Hickman | 179—100.2 X |
| 2,964,594 | 12/1960 | Beckner | 179—100.2 |
| 2,986,725 | 5/1961 | Dirks | 340—174.1 |
| 3,075,049 | 1/1963 | Gordon | 179—100.2 |
| 3,124,661 | 3/1964 | Tyapp | 179—100.2 |
| 3,376,395 | 4/1968 | Rumple | 179—100.2 |
| 3,395,385 | 7/1968 | Scoville | 179—100.2 X |

STANLEY M. URYNOWICZ, Jr., Primary Examiner

R. F. CARDILLO, Jr., Assistant Examiner

U.S. Cl. X.R.

178—6.6